(12) United States Patent
Kasperchik et al.

(10) Patent No.: US 10,472,530 B2
(45) Date of Patent: *Nov. 12, 2019

(54) WHITE INKS

(71) Applicant: Hewlett-Packard Development Company, L.P., Fort Collins, CO (US)

(72) Inventors: Vladek Kasperchik, Corvallis, OR (US); Paul Joseph Bruinsma, San Diego, CA (US); Marcos A. Barreto, Aquadilla, PR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 10 days.

This patent is subject to a terminal disclaimer.

(21) Appl. No.: 15/561,314

(22) PCT Filed: Jul. 20, 2015

(86) PCT No.: PCT/US2015/041168
§ 371 (c)(1),
(2) Date: Sep. 25, 2017

(87) PCT Pub. No.: WO2017/014745
PCT Pub. Date: Jan. 26, 2017

(65) Prior Publication Data
US 2018/0100078 A1    Apr. 12, 2018

(51) Int. Cl.
| C09D 11/32 | (2014.01) |
| C09D 11/322 | (2014.01) |
| C09C 1/36 | (2006.01) |
| C09C 3/06 | (2006.01) |
| C09D 11/54 | (2014.01) |

(52) U.S. Cl.
CPC .......... C09D 11/322 (2013.01); C09C 1/3661 (2013.01); C09C 3/063 (2013.01); C09D 11/54 (2013.01); *C01P 2004/61* (2013.01); *C01P 2004/62* (2013.01); *C01P 2006/22* (2013.01)

(58) Field of Classification Search
CPC ....... C09C 1/3661; C09C 3/063; C09D 11/15; C09D 11/322
USPC .................................. 523/209, 210
See application file for complete search history.

(56) References Cited

U.S. PATENT DOCUMENTS

| 2,187,050 | A | 1/1940 | Patterson |
| 3,437,502 | A | 4/1969 | Werner |
| 3,529,985 | A | 9/1970 | Jester et al. |
| 3,926,660 | A | 12/1975 | Holle et al. |
| 4,075,031 | A | 2/1978 | Allen |
| 4,376,655 | A | 3/1983 | Weber |
| 4,416,699 | A | 11/1983 | Jacobson |
| 5,332,433 | A | 7/1994 | Story et al. |
| 5,439,514 | A | 8/1995 | Kashiwazaki et al. |
| 5,702,519 | A | 12/1997 | Nitta et al. |
| 6,610,136 | B2 | 8/2003 | Malla et al. |
| 6,666,913 | B2 | 12/2003 | Hirano et al. |
| 6,989,054 | B2 | 1/2006 | Tanabe et al. |
| 7,217,386 | B2 | 5/2007 | Wan et al. |
| 7,264,672 | B1 | 9/2007 | Trabzuni et al. |
| 7,276,231 | B2 | 10/2007 | Frerichs et al. |
| 7,919,544 | B2 | 4/2011 | Matsuyama et al. |
| 8,105,432 | B2 | 1/2012 | Bettler et al. |
| 8,348,411 | B2 | 1/2013 | Brust et al. |
| 8,404,761 | B2 | 3/2013 | Shinozaki et al. |
| 8,440,744 | B2 | 5/2013 | Sugita et al. |
| 8,466,213 | B2 | 6/2013 | Ueno et al. |
| 8,574,356 | B2 | 11/2013 | Kagata et al. |
| 8,784,550 | B2 | 7/2014 | Kasperchik |
| 8,859,061 | B2 | 10/2014 | Kasperchik et al. |
| 9,080,072 | B2 | 7/2015 | Kabalnov et al. |
| 9,133,358 | B2 | 9/2015 | Kasperchik et al. |
| 9,394,453 | B2 | 7/2016 | Ng et al. |
| 9,631,104 | B2 | 4/2017 | Adamic |
| 9,732,246 | B2 | 8/2017 | Adamic |
| 9,822,270 | B2 | 11/2017 | Adamic et al. |
| 9,963,607 | B2 | 5/2018 | Adamic et al. |
| 10,167,400 | B2 | 1/2019 | Bruinsma et al. |
| 10,273,374 | B2 | 4/2019 | Bruinsma et al. |
| 2003/0056693 | A1 | 3/2003 | Hayashi et al. |
| 2007/0060670 | A1 | 3/2007 | Ellis |
| 2010/0105807 | A1 | 4/2010 | Sugita et al. |
| 2010/0222492 | A1 | 9/2010 | Sarkisian et al. |
| 2011/0169887 | A1 | 7/2011 | Kabalnov et al. |

(Continued)

FOREIGN PATENT DOCUMENTS

| EP | 1784462 | 5/2007 |
| EP | 2243807 | 10/2010 |

(Continued)

OTHER PUBLICATIONS

U.S. Appl. No. 15/561,712, filed Jul. 2015 (Year: 2015).*
U.S. Appl. No. 15/562,618, filed Jul. 2015 (Year: 2015).*
International Search Report and Written Opinion dated Nov. 12, 2015 for PCT/US2015/041168; Applicant Hewlett-Packard Development Company L.P.
DuPont Ti-Pure R-960 Titanium Dioxide datasheet, Mar. 2012, 1 page.
Ti-Pure R-960 Titanium Dioxide, Chemours, 2015, 2 pages.

*Primary Examiner* — Edward J Cain

(74) *Attorney, Agent, or Firm* — Thorpe North & Western LLP

(57) ABSTRACT

The present disclosure provides an example of a white ink. The ink includes an aqueous ink vehicle and from 5 wt % to 60 wt % of a white flocculated colorant mass. The white flocculated colorant mass can include white metal oxide pigment having an average particulate size from 100 nm to 2,000 nm, silica coated on the white metal oxide pigment to form a silica-coated pigment, and a polymeric dispersant associated with a surface of the silica-coated pigment.

20 Claims, 5 Drawing Sheets

(56) References Cited

U.S. PATENT DOCUMENTS

| | | |
|---|---|---|
| 2011/0184108 A1 | 7/2011 | Okuda et al. |
| 2011/0281032 A1 | 11/2011 | Kagata et al. |
| 2013/0160672 A1 | 6/2013 | Kasperchik |
| 2013/0224451 A1 | 8/2013 | Shiono et al. |
| 2014/0123874 A1 | 5/2014 | Kabalnov et al. |
| 2014/0261086 A1 | 9/2014 | Goparaju et al. |
| 2014/0352573 A1 | 12/2014 | Kasperchik et al. |
| 2015/0184010 A1 | 7/2015 | Okada et al. |
| 2016/0355696 A1 | 12/2016 | Adamic et al. |
| 2017/0355867 A1 | 12/2017 | Kasperchik et al. |
| 2018/0002555 A1 | 1/2018 | Kasperchik et al. |
| 2018/0086933 A1 | 3/2018 | Kasperchik et al. |
| 2018/0100078 A1 | 4/2018 | Kasperchik et al. |
| 2018/0105714 A1 | 4/2018 | Kasperchik et al. |

FOREIGN PATENT DOCUMENTS

| | | |
|---|---|---|
| JP | 2004124077 | 4/2004 |
| JP | 2005298802 | 10/2005 |
| JP | 2011225867 | 11/2011 |
| JP | 2012241057 | 12/2012 |
| JP | 5519112 | 6/2014 |
| WO | 9718268 | 5/1997 |
| WO | 2007124120 | 11/2007 |
| WO | 2012054052 | 4/2012 |
| WO | 2012170032 | 12/2012 |
| WO | 2013162513 | 10/2013 |
| WO | 2014193387 | 12/2014 |
| WO | 2016175871 | 11/2016 |
| WO | 2018190848 | 10/2018 |

\* cited by examiner

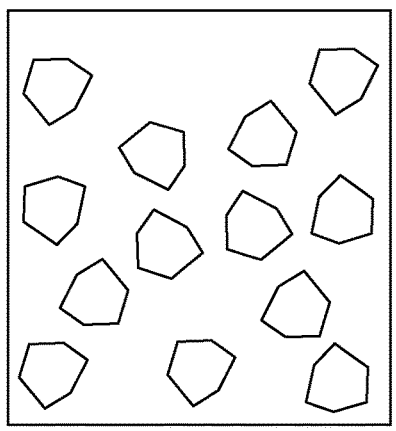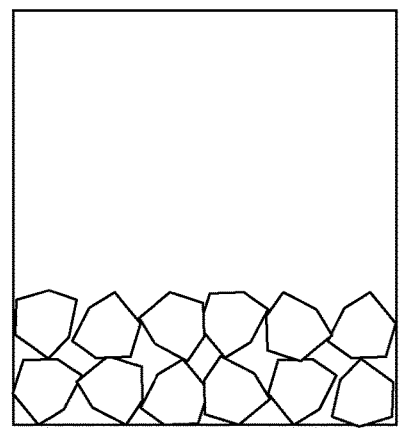
FIG. 1A　　　　　　　　　FIG. 1B
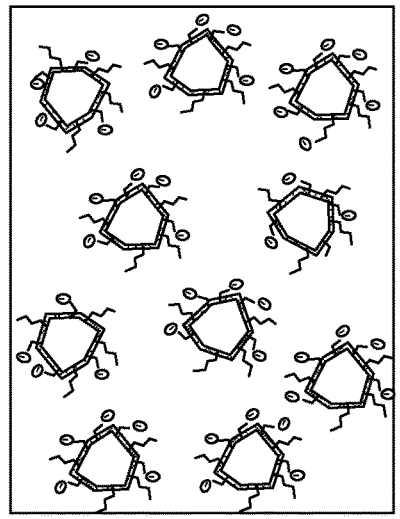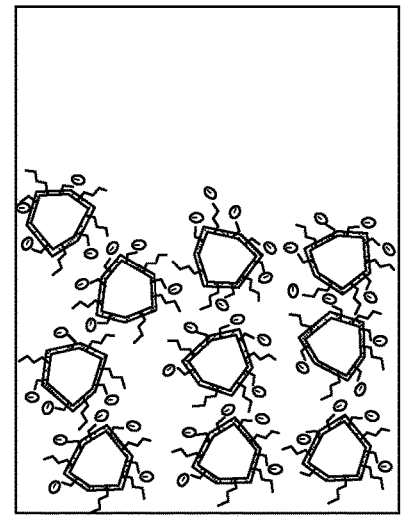
FIG. 1C　　　　　　　　　FIG. 1D

WHITE INKS

BACKGROUND

The use of inkjet printing systems has grown dramatically in recent years. This growth may be attributed to substantial improvements in print resolution and overall print quality coupled with appreciable reduction in cost. Today's inkjet printers offer acceptable print quality for many commercial, business, and household applications at lower costs than comparable products available just a few years ago. Notwithstanding their recent success, research and development efforts continue toward improving inkjet print quality over a wide variety of different applications, but there remain challenges.

BRIEF DESCRIPTION OF THE DRAWINGS

Additional features and advantages of the disclosure will be apparent from the detailed description which follows, taken in conjunction with the accompanying drawings, which together illustrate, by way of example, features of the present technology.

FIG. 1A depicts dispersed white metal oxide pigment, and FIG. 1B depicts typical settling that occurs with white metal oxide pigment, such as $TiO_2$, over a short amount of time;

FIG. 1C depicts dispersed white metal oxide pigment prepared in accordance with examples of the present disclosure, and FIG. 1D depicts settling that occurs over time to form flocs therefrom in accordance with examples of the present disclosure;

Figure 2:
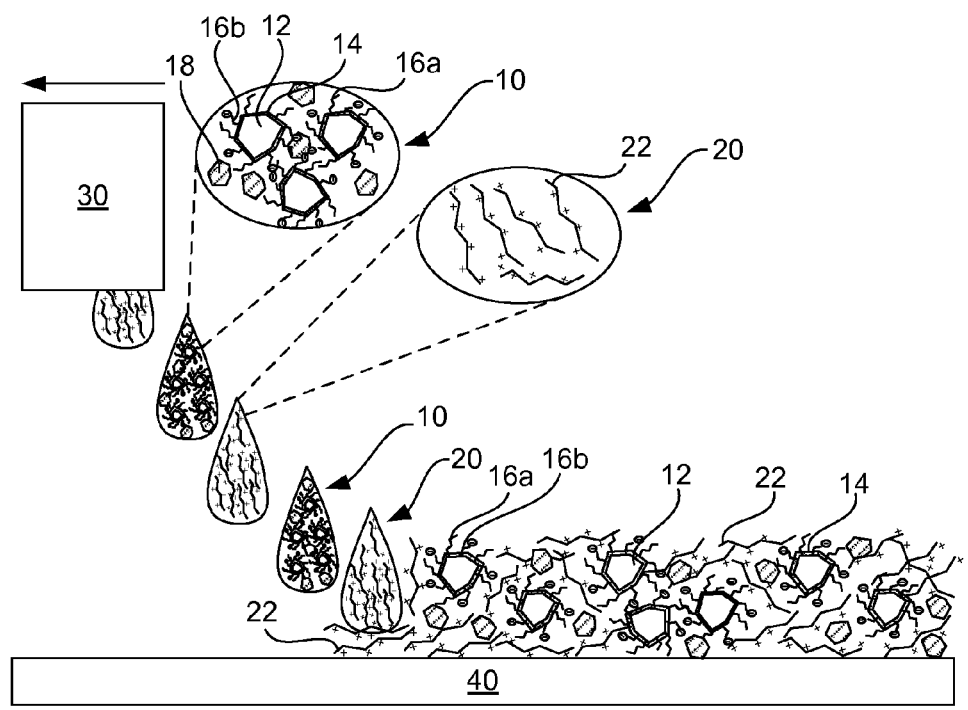
FIG. 2 depicts examples where a cationic polymer formulation is digitally printed on a media substrate contemporaneously or just before printing a white inkjet ink thereon, and wherein the white inkjet ink is prepared in accordance with examples of the present disclosure.

Reference will now be made to certain examples, and specific language will be used herein to describe the same. It will nevertheless be understood that no limitation of the scope of the disclosure is thereby intended.

DETAILED DESCRIPTION

The present disclosure is drawn to white inks, including water-based white inkjet inks that can be jetted from various types of inkjet printheads, but which can also be particularly friendly for use in thermal inkjet printheads. These inks, in some instances with the assistance of a fixer coating layer or fixer ink, can be printed not only on porous media, but also effectively on more challenging non-porous polymer media.

Certain pigments can be more challenging to print than others in achieving some desirable properties. For example, ink opacity corresponding to white appearance can be more difficult to achieve for white inks compared to black, magenta, or cyan inks. Additionally, high colorant loads and large pigment particle size can lead to settling that clogs inkjet printheads and other microchannels. More specifically, the combination of high bulk densities and larger particle sizes tend to lead to high settling rates of the pigment in water-based inkjet ink formulations, and these larger and denser pigments can form a sediment very rapidly, e.g., within a few days. Once the sediment has formed, the gravitational forces tend to lead to a tight compaction or cemented sediment, which is very challenging to resuspend, plugging printheads and microchannels, etc. Prolonged stirring or shaking may not be sufficient to break down the aggregated particles in the sediment to unclog blocked channels and restore the settled ink to its original useable state. Furthermore, irreversible pigment settling can also reduce print quality because the formation of non-redispersible pigment sediment depletes bulk pigment concentration in the ink liquid portion that remains, compromising print opacity. In a more extreme case, settling in a manner where resuspension cannot be achieved may even render the ink substantially transparent.

The white inks of the present disclosure address problems related to system reliability and print opacity performance of white inks that use relatively large and dense white metal oxide pigment particles. To illustrate, high bulk density of white metal oxide pigment, such as $TiO_2$, which have a relatively large particle size, e.g., from 100 nm to 2000 nm, from 150 nm to 750 nm, or from 200 nm to 500 nm, can be used to provide high opacity performance. However, the high bulk density, e.g., about 4.2 for the rutile form, and large size also can result in fast settling of the pigment in low viscosity water-based inkjet ink formulations. More specifically, $TiO_2$ particles (See FIG. 1A) can easily agglomerate resulting sediment (See FIG. 2B) that is difficult to break apart, e.g., layers with very strong inter-particle cohesion are formed. This can clog fluidic pathways of ink delivery systems and inkjet printheads, rendering the printing device non-operational within few days.

Because it can be difficult to completely eliminate settling of large dense particles in low viscosity environments, reducing settling rate or allowing for settling in a manner that is producing sediment more easily resuspendable provides a good solution to this problem. Thus, in accordance with examples of the present disclosure, white metal oxide pigment can be treated with a silica to form a coating, and the coated pigment can be further dispersed with a polymeric dispersing agent (See FIG. 1C) that does not stop gravitational settling, but rather, provides conditions where a loose floc of pigment (See FIG. 1D) is formed that is easily resuspended with minor agitation or shaking. Essentially, by milling the white metal oxide pigment coated with silica and polymeric dispersant, a silica coating is partially fragmented off the white metal oxide pigment, and the composite particle (composed of original pigment and fragments of silica coating) is further suspended by the polymeric dispersing agent associated therewith. This allows for a more controlled destabilization of the pigment in the aqueous ink vehicle. By allowing sedimentation of the weakly associated colloid particles to occur (as loose flocs), a fluffy sediment of low density is formed that can be easily resuspended without permanent clogging of the inkjet printhead and/or fluid channels. Thus, when settling, more benign flocs of white metal oxide pigment form (rather than tightly packed pigment that is unrecoverable). Furthermore, the silica coating on the pigment surface may also cooperate with the latex particles typically also present in the ink to act as a low n spacer between white metal oxide pigment particles, thereby improving white print opacity.

In accordance with this, the present disclosure is drawn to a white ink that can include an aqueous ink vehicle, and from 5 wt % to 60 wt % white flocculated colorant mass. The white flocculated colorant mass can include white metal oxide pigment having an average particulate size from 100 nm to 2,000 nm, silica coated on the white metal oxide pigment to form a silica-coated pigment, and a polymeric dispersant associated with the silica-coated pigment. The white metal oxide pigment content to silica content can be from 100:3.5 to 5:1 by weight. In one example, the white ink can further include from 2 wt % to 30 wt % of latex particulates. In another specific example, the white metal oxide pigment can have a refractive index of 1.8 to 3.0, a bulk density from 3.0 to 4.5. Thus, since this size of pigment and this bulk density of pigment tends to settle rather quickly, by coating the white metal oxide pigment with silica and associating the surface with polymeric dispersant, when settling does occur, colorant can be easily resuspended from the white flocculated colorant mass in preparation for inkjet application.

In one example, the in addition to the silica, alumina also coated on the white metal oxide pigment. In another example, e.g., the white metal oxide pigment content to total silica and alumina content can be from 50:3 to 4:1 by weight. In another example, the white ink can include from 5 wt % to 50 wt % the white metal oxide pigment, from 0.175 wt % to 10 wt % silica, and from 0.005 wt % to 5 wt % polymeric dispersant (based on the ink formulation as a whole). In still another example, the white metal oxide pigment can include titanium dioxide particulates, zinc oxide particulates, zirconium oxide particulates, or a combination thereof. The white ink can also include latex particulates having a glass transition temperature from $-20°$ C. to $130°$ C. In further detail, the polymeric dispersant can include a short-chain anionic dispersant having an acid number higher than 100 mg KOH/g based on dry polymer weight, or a non-ionic or predominantly non-ionic dispersant having an acid number not higher than 100 mg KOH/g based on dry polymer weight, or both. In still another example, the white ink can be in an agitated state so white colorant is resuspended from the white flocculated colorant mass. Furthermore, in one example, the white ink can be non-Newtonian as defined by viscosity measured at a 10 $sec^{-1}$ shear rate that is at least 10% higher than the viscosity measured at shear rate of 1000 $sec^{-1}$ at $25°$ C.

A method of making a white ink can include milling a white metal oxide pigment in a water-based carrier with silica and a polymeric dispersant to form a white dispersion containing a suspended white colorant. The suspended white colorant (which forms a white flocculated colorant mass upon settling) can include white metal oxide pigment having an average particulate size from 100 nm to 2,000 nm, silica coated on the white metal oxide pigment to form a silica-coated pigment, and a polymeric dispersant associated with the silica-coated pigment. The white metal oxide pigment content to silica content can be from 100:3.5 to 5:1 by weight. The white dispersion can be admixed with a liquid vehicle to form the white ink. Latex particles can also be admixed therewith in some examples.

In one example, the method can include allowing the white ink to destabilize so that the suspended white colorant forms a white flocculated colorant mass. This white flocculated mass can be resuspended prior to printing, for example. In another example, the method can include admixing latex particulates with the white dispersion or the white ink. In such an example, the white ink can include from 5 wt % to 60 wt % of the suspended white colorant; from 0.1 wt % to 15 wt % of the silica; from 0.005 wt % to 5 wt % of the polymeric dispersant; and from 2 wt % to 30 wt % of the latex particulates having a glass transition temperature from $0°$ C. to $130°$ C.

A fluid set for inkjet imaging can include a white ink having an aqueous ink vehicle, and from 5 wt % to 60 wt % of a white flocculated colorant mass suspended in the aqueous ink vehicle. The white flocculated colorant mass can include white metal oxide pigment having an average particulate size from 100 nm to 2,000 nm, silica coated on the white metal oxide pigment to form a silica-coated pigment, and a polymeric dispersant associated with the silica-coated pigment. The white metal oxide pigment content to silica content can be from 100:3.5 to 5:1 by weight. In one specific example, the white ink can further include from 2 wt % to 30 wt % of latex particulates. The fluid set can further include a fixer fluid, including an aqueous fixer vehicle, and from 0.1 wt % to 25 wt % cationic polymer.

In one example, the fixer fluid can be formulated for inkjet application, or for analog application, e.g., rolling, brushing, curtain coating, blade coating, Meyer rod coating, etc. For example, the white ink can be formulated for inkjet application upon agitation to resuspend white colorant from the white flocculated colorant mass, and the fixer fluid can be formulated (i) for inkjet application having a viscosity from 1 cP to 35 cP at $25°$ C., or (ii) for analog application having a viscosity from 1 cP to 500 cP at $25°$ C. In another example, the white ink further can further include alumina also coated on the white metal oxide pigment. For example, the white metal oxide pigment content to total silica and alumina content can be from 50:3 to 4:1 by weight.

In certain specific examples, these white inks or dispersion can be prepared with good sediment re-dispersibility, and can be prepared by milling base white metal oxide pigment, e.g., $TiO_2$, powder where the pigment is coated with a gel-sol coating of silica in water-based slurry containing about 20 wt % to about 70 wt %, for example, of the pigment/silica particles and dispersant(s). Thus, when preparing the white ink from the pigment/silica/dispersant slurry, ink vehicle components can be added, such as water, organic co-solvent, surfactant, etc., to form the white ink having from 5 wt % to 60 wt % colorant mass, from 10 wt % to 60 wt % colorant mass, from 15 wt % to 60 wt % colorant mass, from 20 wt % to 60 wt % colorant mass, from 25 wt % to 60 wt % colorant mass, from 30 wt % to 60 wt % colorant mass, etc., either in flocculated or re-suspended form.

These white inks can be used in forming white images on various media substrate, including smooth polymer (non-porous) media substrate, and can be printed in combination, as mentioned, with a fixer coated on the surface of the media. For example, a fixer with cationic polymer can be applied to the media substrate and can be formulated so that its cationic polymer interacts with any anionically charged components in the white ink to immobilize the white metal oxide pigment.

In each of these examples, there are several advantages related to the inclusion of the modified white metal oxide pigment. For example, as mentioned, the silica- and polymeric dispersant-modified white metal oxide pigment allows for a controlled destabilization of the pigment in the aqueous ink vehicle, e.g., allowing weakly associated sedimentation of colloid particles to occur (as loose flocs) such that fluffy sediment of lower density flocs can be easily resuspended. Furthermore, as mentioned, the silica coating on pigment surface may also cooperate with the latex particles to act as a low n spacer between white metal oxide pigment particles, thereby improving white print opacity, as will be described herein in greater detail.

Figure 3:
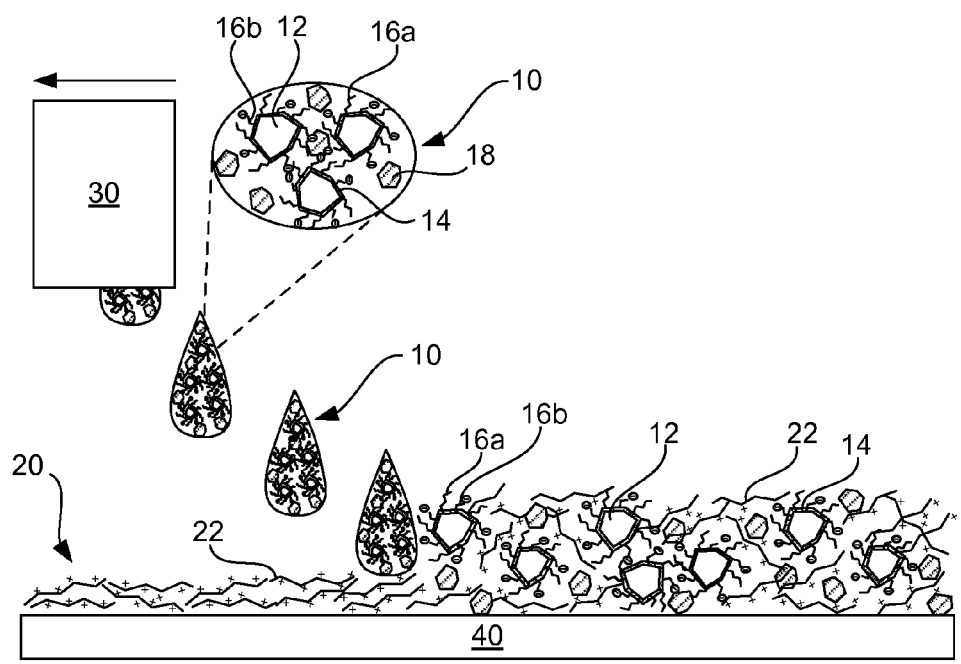
FIG. 3 depicts examples where a cationic polymer is applied to a media substrate prior to (either digital or by analog application) printing a white inkjet ink thereon, and wherein the white inkjet ink is prepared in accordance with examples of the present disclosure.

FIG. 2 depicts an example where a digitally printed fixer is applied just prior to or essentially simultaneously with an inkjet ink of the present disclosure. FIG. 3 depicts an example where a fixer is applied to a media substrate prior to application of an inkjet ink. The fixer in this latter example can likewise be applied by digital printing, or alternatively, by analog application, e.g., rolling, brushing, curtain coating, blade coating, Meyer rod coating, or any other coating methodology suitable for producing thin layer of fixer on the printed substrate, etc. As shown in FIGS. 1 and 2, an inkjet printing device 30 is provided to digitally print a white inkjet ink 10, and in some examples, a fixer composition 20 on a media substrate 40. The media substrate can be a smooth, non-porous polymer substrate that is otherwise difficult to print on with high image quality and high durability. Specifically, FIG. 1 shows the fixer composition being printed digitally from the printing device, and FIG. 2 shows the fixer composition being pre-applied to the media substrate, either digitally or by an analog coating method. In both examples, the white inkjet ink includes suspended white colorant that includes a white metal oxide pigment 12 coated with silica 14 and associated with polymeric dispersants 16a,16b. In this specific example, there are two types of polymeric dispersants, namely a non-ionic or predominantly non-ionic dispersant 16a (e.g., acid number not higher than 100 mg KOH/g based in dry polymer content) and a short-chained anionic dispersant 16b (higher than 100 mg KOH/g based on dry polymer content), but this is not required. Latex particulates 18 are also shown in the ink, all suspended by an aqueous ink vehicle, which typically includes water, organic co-solvent, and the like. The fixer composition can include cationic polymer 22 dissolved in a fixer vehicle, wherein the cationic polymer is interactive with the suspended white colorant or other anionic components that may be found in the white ink, thereby providing some immobilization or freezing of the pigment and particles on the print media substrate.

Figure 4:
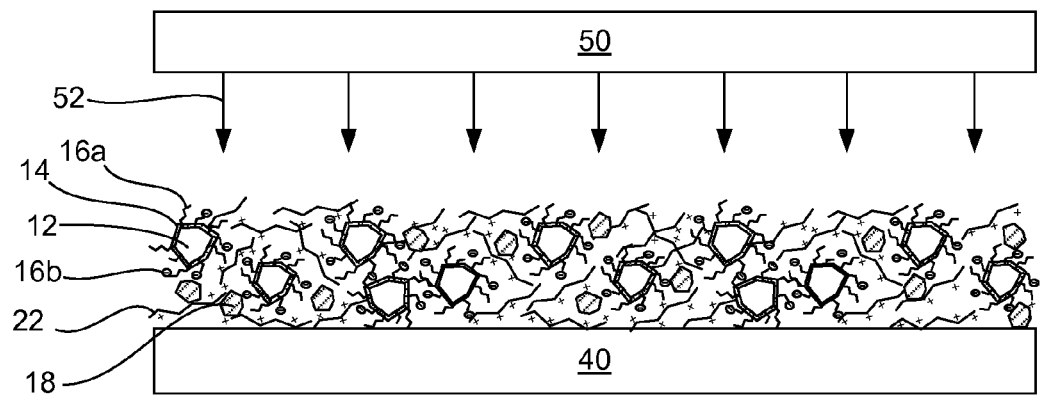
FIG. 4 depicts examples of heat drying and fusing an image printed in as described in FIG. 2 or 3 in accordance with examples of the present disclosure.
Figure 5:
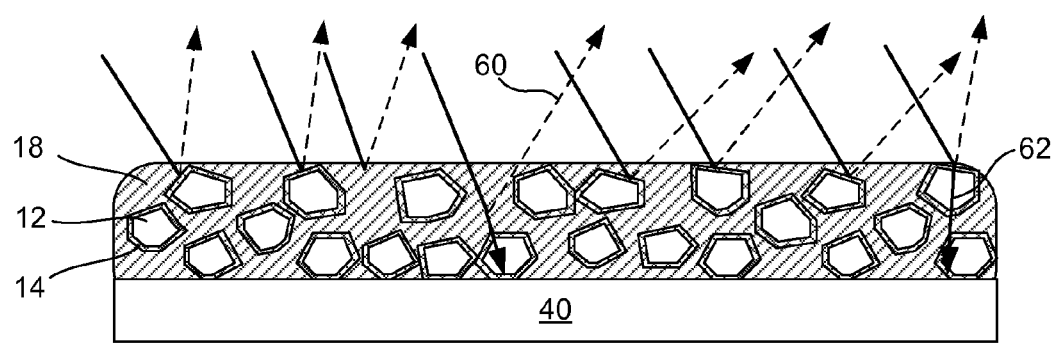
FIG. 5 depicts a printed article, such as that shown in FIG. 4, after heat fusing on the media substrate in accordance with examples of the present disclosure.

In another example, the image printed or otherwise generated in accordance with FIGS. 2 and 3 can be heat fused. More specifically, FIG. 4 shows a heat fusing device 50 which is used to apply heat 52 to the printed article to form a heat fused printed article as shown in FIG. 4. Because of the presence of both the silica 14 and the latex particulates 18 (heat fused as a non-continuous mass with other polymers that may be present) providing spacing between white metal oxide pigment particles 12, there can be enhanced light scattering 60 and lower transmittance 62 than even more densely packed white metal oxide pigment, which thus provides enhanced opacity. This increased opacity can be achieved by optically spacing the white metal oxide pigment from one another. For example, because of the relative high refractive index of the white metal oxide pigment and the relative low refractive index optical spacing provided by the silica, latex, etc., the opacity of the printed coating can be boosted by from 0.1% to 25%, or more typically from 5% to 20% or from 5% to 25% compared to an inks without optical spacing material. In other words, the crowding effect of tightly-packed high refractive index (n) particulates with little or no voids decreases light scattering and increase transparency of the coating. By optically spacing the white metal oxide pigment with the low refractive index materials (and typically heat fusing the latex after printing), an increase in opacity can be realized. As a further point, fusion can add enhanced durability to the printed article. In some cases, the fusing of the latex particulates may help the latex polymer distribute more evenly between light scattering white metal oxide pigment particles and, hence, further improve opacity as well. That, in combination with the presence of the silica coating, can provide improved results.

In accordance with this, a printed article can include up to 80 gsm, or up to 50 gsm, of a total fluids (white ink+fixer) applied to a media substrate. The term "up to 80 gsm" is used because typical inkjet images include fully imaged areas as well as non-imaged and/or lower density areas. After water and solvent(s) evaporation and fusing, the gsm roughly translates into 15-50 wt % of the initial fluid dispersion flux density, i.e. thus less than 60 gsm. In one example, full density inked area may be at from 30 to 60 gsm ink/fixer film, but densities lower in the tone ramp will be lower than this, thus the use of the phrase "up to" 75 gsm or "up to" 60 gsm. That being stated, though some areas on a media substrate might be at 0 gsm under this definition (unprinted areas), there will be areas that are imaged that range from greater than 0 gsm up to 60 gsm (after drying or heat fusing). In a typical printed article, there is a portion of the media that can be printed at from 5 gsm to 60 gsm.

Turning now to the various specific ingredients that are present in the white ink, there can be a white metal oxide pigment. The "white" pigment provides much of the white coloration to the ink, though without the other ingredients in the ink, individual pigment particles may have some transparency or translucency. Examples of white metal oxide pigments that can be used include titanium dioxide particulates, zinc oxide particulates, zirconium oxide particulates, combinations thereof, or the like. In one specific example, the white metal oxide pigment can be titanium dioxide ($TiO_2$), and even more specifically, rutile. Thus, the white inks of the present disclosure are based on transparent metal oxide pigment particles with very high refractive index, that when spaced appropriately, provide very opaque and white print layers.

Pigments with high light scattering capabilities, such as these, can be selected to enhance light scattering and lower transmittance, thus increasing opacity. White metal oxide pigments can have a particulate size from about 100 nm to 2,000 nm, or from 150 nm to about 1,000 nm, or more typically, from about 150 nm to 750 nm, and in still another example, from about 180 nm to 400 nm. The combination of these pigments within these size ranges, appropriately spaced from one another with ingredients such as the silica coating and latex particulates, high opacity can be achieved at relatively thin thickness, e.g., 5 gsm to 60 gsm or 5 gsm to 50 gsm after removal of water and other solvent(s) from the printed ink and fixer film.

Regarding the silica coating that can be applied to the white metal oxide pigment, any of a number of silica compositions can be used. The silica can be coated on the pigment by precipitation from liquid phase, and in some examples, there are commercially available silica-containing $TiO_2$ pigments (or other white metal oxide pigments) that can be used. These commercially available pigments which include silica can be milled with polymeric dispersant, as described in greater detail hereinafter. Essentially, however, when silica and white metal oxide pigment is co-milled with polymeric dispersant in an aqueous environment, a large number of gel-coat particles can be formed, similar to that shown in FIGS. 1C and 1D. As a side note, silica coatings need not be only silica. In some examples, silica coatings can include other materials, such as alumina.

The amount of free gel-coat particles produced in these dispersions during the milling process can be dependent on the original silica content in the commercial pigment formulation. When the number of gel-coat particles is high enough, the gel-coat particles tend to compete with uncoated white metal oxide pigment particles for adsorption of the polymeric dispersant(s). Thus, a large number of individual silica or gel-coat particles can use up enough of the dispersants from liquid phase to start destabilizing or flocculating the milled pigment particles. This phenomenon usually manifests itself in increased milled slurry viscosity and its non-Newtonian (shear-thinning) rheological behavior. Thus, in accordance with examples of the present disclosure, in order to achieve the loose floc formation (or controlled destabilization) that is desirable, the silica coated particle content should be high enough to cause flocs to form when settling over time. In other words, white metal oxide pigment particles in higher gel-coat content dispersions agglomerate into loose flocs and tend to form voluminous sediments which can be redispersed easily by fluid agitation, which is desirable. To describe one specific example, the settling can form a semi-liquid yogurt-like consistency flocculated mass produced by settling of milled high gel-coat white metal oxide pigment. For example, silica coated pigment Ti-Pure® R931 available from DuPont has a high silica and alumina content of about 16.6 wt % (12.2 wt % silica) based on the pigment content, and thus, when milled with polymeric dispersant, can form the suspended flocs described herein, which are easily re-suspended.

As a note, a white ink or a white dispersion used to prepare the white ink can have "non-Newtonian" or "shear thinning" properties in relation to higher concentrations of weakly bound agglomerates or flocculated masses. For example, a non-Newtonian ink or dispersion may be defined such that the viscosity of an ink or dispersion measured at 10 $sec^{-1}$ shear rate is at least 10% higher, or in one example at least 20% higher, than the viscosity of the ink or dispersion when measured at shear rate of 1000 $sec^{-1}$. Or, for example, a non-Newtonian ink or dispersion may have a viscosity measured at 10 $sec^{-1}$ shear rate that is at least about 2 times (2×) higher than the viscosity of the ink or dispersion when measured at shear rate of 1000 $sec^{-1}$ at 25° C. Thus, a white ink, depending on the concentration of pigment (with silica and polymeric dispersant), can have a non-Newtonian character when the "colorant" is in the form of a flocculated colorant mass, and a Newtonian character when the colorant is re-suspended in preparation for inkjet application, for example. On the other hand, the white ink can be Newtonian in either state, and it is the pigment dispersion used to prepare the white ink that exhibits non-Newtonian behavior prior to further dilution with ink vehicle components.

To provide some concentration ranges that are useful, raw $TiO_2$ pigment (or other white metal oxide pigment) coated with a silica coating (e.g., precipitated silica to form a gel-coat) can be prepared with alumina at a total amount of the gel-coat (silica+alumina content) on pigment surface at greater than about 6 wt % based on white metal oxide pigment weight, more than about 8 wt % based on white metal oxide pigment weight, more than about 10 wt % based on white metal oxide pigment weight, or more than about 15 wt % based on white metal oxide pigment weight. Thus, in one example, the white metal oxide pigment and silica/alumina content can be present in the white ink at weight ratio from 50:3 to 4:1. Silica content per se (without counting the added alumina) in the gel-coat can be greater than about 3.5 wt % based on the total white metal oxide pigment weight, greater than 5 wt % based on the total white metal oxide pigment weight, or greater than 7 wt % based on the total white metal oxide pigment weight. To illustrate, if the formulation includes 5 wt % white metal oxide pigment, then 3.5 wt % of the 5 wt % is 0.175 wt % silica. In further detail, in one example, the white metal oxide pigment content and silica content can be present in the white ink at weight ratio from 100:3.5 to 5:1.

Silica coated- and polymeric dispersant-modified white metal oxide pigments produced as described herein can be rendered or formulated into a inkjet ink formulation suitable for reliable printing through thermal inkjet printhead. During long-term inactivity of such white ink formulations, e.g. found in inkjet printhead and microfluidic channels as well as in ink supplies, the ink formulations can form pigment sediment. This settling can be remedied by short-term agitation and/or recirculation of the settled ink in the printhead, microfluidic channels, and ink supply of the printer, which easily recovers the ink to a properly working or jettable state.

The white metal oxide pigment with silica coated thereon as part of a gel-coat, among other solids that may be present, can be dispersed by milling the components together. Typically, the silica and the metal oxide pigment is co-milled with the polymeric dispersant. In one example, the white metal oxide pigment and the silica can be milled with the polymeric dispersant, and in another example, the white metal oxide pigment can be pre-coated with the silica, and the coated pigment can be co-milled with the polymeric dispersant. Either approach can generate the white flocculated colorant mass that is easily resuspendible described herein.

Regarding the polymeric dispersants per se, any of a number of polymeric dispersants can be used. For example, a short-chain anionic dispersant can be used, a non-ionic or predominantly non-ionic dispersing agent, and/or any other dispersant effective for dispersing the white metal oxide pigment. Suitable dispersing agents can allow for dispersibility and stability in an aqueous ink environment, as well as for contributing to controlled destabilizing effect (along with the silica coating) when the white metal oxide pigment settles and forms a white flocculated colorant mass. These dispersants can also be prepared to have little to no impact on the viscosity of the liquid phase of the ink, as well as retain good printhead reliability in thermal inkjet printheads (if the ink is a thermal inkjet ink). If the ink is a piezo inkjet ink, then additional flexibility regarding viscosity is tolerable. Dispersant of one or various types can each be present in the inks of the present disclosure at various concentrations, such as from 0.005 wt % to 5 wt %.

For definitional purposes, "short-chain anionic dispersants" that can be used include polymeric dispersants with chain length short enough to impact viscosity of ink formulation at moderate concentrations, typically having an acid number higher than 100 mg KOH/g based in dry polymer content. For example, short-chain anionic dispersants can include dispersants having a weight average molecular weight lower than 30,000 Mw, or more typically, lower than 15,000 Mw, e.g., 1,000 Mw to 30,000 Mw, or from 2,000 Mw to 15,000 Mw.

Also for definitional purposes, "non-ionic or predominantly non-ionic dispersants" include non-ionic dispersants, as well as only weakly ionic dispersants, i.e. the acid number of the non-ionic or predominantly non-ionic/weak anionic dispersant, per dry polymer, is typically not higher than 100 mg KOH/g, and is typically not higher than 50 mg KOH/g, or even not higher than 30 mg KOH/g. That being state, in one example, non-ionic dispersing agent with no anionic properties can be used. These non-ionic or predominantly non-ionic dispersants can range in average molecular weight from 500 Mw to 50,000 Mw, in certain examples.

Turning now to the short-chain anionic dispersants, examples include polymers and/or oligomers with low weight average molecular weight. More specifically, low molecular weight (Mw) short-chain anionic dispersants can include acrylic and methacrylic acids homopolymers such as polyacrylic acid (PAA), polymethacrylic acid (PMAA), or their salts. More specific examples include, but are not limited to, Carbosperse® K-7028 (PAA with M-2,300), Carbosperse® K-752 (PAA with M-2,000), Carbosperse® K-7058 (PAA with M-7,300), Carbosperse® K-732 (PAA with M-6,000), Carbosperse® K-752 (Na salt of PMAA with M-5,000), all available from Lubrizol Corporation. Others include Dispex® AA 4935 available from BASF Dispersions & Pigments Division, as well as Tamol® 945 available from Dow Chemical. Low molecular weight acrylic and methacrylic acid co-polymers with other carboxylic monomer moieties can also be used, such as co-polymers of acrylic and maleic acids available from Kelien Water Purification Technology Co. Low molecular weight co-polymers of carboxylic acid monomers with other water-soluble non-carboxylic acidic monomer moieties, such as sulfonates, styrenesulfonates, phosphates, etc., can also be used. Examples of such dispersants include, but are not limited to, Carbosperse® K-775 and Carbosperse® K-776 (co-polymers of acrylic and sulfonic acid), Carbosperse® K-797, Carbosperse® K-798, or Carbosperse® K-781 (co-polymers of acrylic, sulfonic acid and styrenesulfonic acid), all available from Lubrizol Corporation. Additionally, low molecular weight co-polymers of carboxylic acid monomers with some hydrophobic monomers can likewise be used. Dispersants from this group are suitable here if their acid number (content of hydrophilic acidic moieties in polymer chain) is high enough to make the dispersant well soluble in aqueous phase. Examples of such dispersants include, but are not limited to styrene-acrylic acid copolymers such as Joncryl® 671, Joncryl® 683, Joncryl® 296, or Joncryl® 690, available from BASF, as well as other water soluble styrene-maleic anhydride co-polymer resins.

Referring now to the non-ionic dispersants that can be used, examples include water-hydrolysable silane coupling agents (SCAs) with relatively short (oligomer length range of not longer than 50 units, not longer than 30 units, or not longer than 15 units, e.g., 10 to 15 units) polyether chain(s), which are also soluble in water. An example of such a dispersant includes Silquest® A1230 polyethylene glycol methoxysilane available from Momentive Performance Materials. Other examples include soluble low-to-midrange M (e.g., usually molecular mass of the polymer less than 15,000 Da) branched co-polymers of comb-type structures with polyether pendant chains and acidic anchor groups attached to the backbone, such as Disperbyk® 190 and Disperbyk® 199 available from BYK Chemie, as well as Dispersogen® PCE available from Clariant. In one example, one or both of Cab-O-Sperse® K-7028 and Disperbyk® 190 can be used.

In one example, reactive hydrophilic alkoxysilane dispersants that can be present, and examples include, but are not limited to, hydrolysable alkoxysilanes with alkoxy group attached to water-soluble (hydrophilic) moieties, such as water-soluble polyether oligomer chains, phosphate groups, or carboxylic groups. In some examples, the dispersant used to disperse the silica coated white metal oxide pigment can be a polyether alkoxysilane or polyether phosphate dispersant. Upon dissolution in water with the silica and the white metal oxide pigment, the alkoxysilane group of the dispersant often hydrolysis resulting in formation of silanol group. The silanol group, in turn, may react or form hydrogen bonds with hydroxyl groups of metal oxide particulate surface, as well as with silanol groups of other dispersant molecules through hydrogen bonding. These reactions lead to bonding or preferential absorption of the dispersant molecules to the metal oxide particulate surfaces and also form bonds between dispersant molecules themselves. As a result, these interactions can form thick hydrophilic coatings of reactive dispersant molecules on surface of the silica coated white metal oxide pigment. This coating can increase the hydrodynamic radius of the particulates and thus reduce their effective density and settling rate. Furthermore, the dispersant coating prevents agglomeration of the silica coated white metal oxide pigment upon settling so that when sediment and settling does occur over time in the ink formulations, the settled silica coated white metal oxide pigment remain fluffy and thus are easy to re-disperse upon agitation. In still further detail, these dispersants have a relatively short chain length and do not contribute significantly to the ink viscosity, even with relatively high metal oxide particulate loads, e.g. over 25 wt % white metal oxide pigment in the ink.

As mentioned, a suitable alkoxysilane dispersant can have an alkoxysilane group which can be easily hydrolyzed in aqueous environment and produce a silanol group, and a hydrophilic segment. The general structure of the alkoxysilane group is $-Si(OR)_3$, where R most can be methyl, ethyl, n-propyl, isopropyl, or even a longer (branched or unbranched) alkane chain. It is noted that the longer the hydrocarbon (R), the slower hydrolysis rate and rate of interaction with dispersed metal oxide particulate surface. In a few practical examples, structures with $-Si(OR)_3$ where R is methyl or ethyl, can typically be used. The hydrophilic segment of the alkoxysilane dispersant can likewise be large enough (relative to the whole molecule size) in order to enable dispersant solubility in aqueous environment, as well as prevent agglomeration of the silica coated white metal oxide pigment. In one example, the hydrophilic segment can be a polyether chain, e.g., polyethylene glycol (PEG) or its co-polymer with polypropylene glycol (PPG). Polyether-based dispersant moieties have clean thermal decomposition, and thus, are good candidates for use. When heated above decomposition temperature, PEG and PPG-based molecules decompose into smaller molecular fragments with high volatility or good water solubility. Thus, their decomposition usually does not form noticeable amounts of solid residue on surface of microscopic heaters used for driving thermal inkjet printheads (which can cause thermal inkjet printheads to fail over time or render them non-operational in some instances).

In further detail, examples polyether alkoxysilane dispersants that may be used to disperse silica coated white metal oxide pigment can be represented by the following general Formula (I):

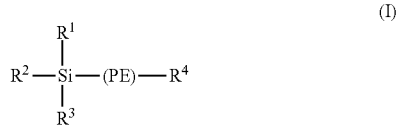

wherein:

a) $R^1$, $R^2$ and $R^3$ are hydroxy groups, or hydrolyzable linear or branched alkoxy groups. For hydrolyzable alkoxy groups, such groups can have 1 to 3 carbon atoms; in one aspect, such groups can be $—OCH_3$ and $—OCH_2CH_3$. In some examples, $R^1$, $R^2$ and $R^3$ are linear alkoxy groups having from 1 to 5 carbon atoms. In some other examples, $R^1$, $R^2$ and $R^3$ groups are $—OCH_3$ or $—OC_2H_5$.

b) PE is a polyether oligomer chain segment of the structural formula $[(CH_2)_n—CH(R)—O]_m$, attached to Si through Si—C bond, wherein n is an integer ranging from 0 to 3, wherein m is an integer superior or equal to 2 and wherein R is H or a chain alkyl group. R can also be a chain alkyl group having 1 to 3 carbon atoms, such as $CH_3$ or $C_2H_5$. In some examples, m is an integer ranging from 3 to 30 and, in some other examples, m is an integer ranging from 5 to 15. The polyether chain segment (PE) may include repeating units of polyethylene glycol (PEG) chain segment ($—CH_2CH_2—O—$), or polypropylene glycol (PPG) chain segment ($—CH_2—CH(CH_3)—O—$), or a mixture of both types. In some examples, the polyether chain segment (PE) contains PEG units ($—CH_2CH_2—O—$); and c) $R^4$ is hydrogen, or a linear or a branched alkyl group. In some examples, $R^4$ is an alkyl group having from 1 to 5 carbon atoms.

Other examples of dispersants used to disperse silica coated white metal oxide pigment can include polyether alkoxysilane dispersants having the following general Formula (II):

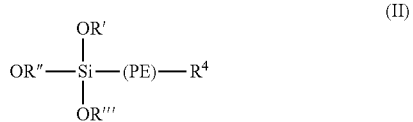

wherein R', R" and R' are linear or branched alkyl groups. In some examples, R', R" and R' are linear alkyl groups having from 1 to 3 carbon atoms in chain length. In some examples, R', R" and R'"—$CH_3$ or —$C_2H_5$. $R^4$ and PE are as described above for Formula (I); i.e. PE is a polyether oligomer chain segment of the structural formula: $[(CH_2)_n—CH—R—O]_m$, wherein n is an integer ranging from 0 to 3, wherein m is an integer superior or equal to 2 and wherein R is H or a chain alkyl group; and $R^4$ is hydrogen, or a linear or a branched alkyl group. In some examples, $R^4$ is $CH_3$ or $C_2H_5$.

In some examples, the silica coated white metal oxide pigment present in the ink compositions are dispersed with polyether alkoxysilanes. Examples of suitable polyether alkoxysilanes include $(CH_3O)_3Si—(CH_2CH_2O)_{n'}$ H; $(CH_3CH_2O)_3Si—(CH_2CH_2O)_{n'}H$; $(CH_3O)_3Si—(CH_2CH_2O)_{n'}$ $CH_3$; $(CH_3CH_2O)_3Si—(CH_2CH_2O)_{n'}$ $CH_3$; $(CH_3O)_3Si—(CH_2CH_2O)_{n'}$ $CH_2CH_3$; $(CH_3CH_2O)_3Si—(CH_2CH_2O)_{n'}$ $CH_2CH_3$; $(CH_3O)_3Si—(CH_2CH(CH_3)O)_{n'}$, H; $(CH_3CH_2O)_3Si—(CH_2CH(CH_3)O)_{n'}$, H; $(CH_3O)_3Si—(CH_2CH(CH_3)O)_{n'}$, $CH_3$; $(CH_3CH_2O)_3Si—(CH_2CH(CH_3)O)_{n'}$ $CH_3$; wherein n' is an integer equal to 2 or greater. In some examples, n' is an integer ranging from 2 to 30 and, in some other examples, n' is an integer ranging from 5 to 15.

Commercial examples of the polyether alkoxysilane dispersants include, but are not limited to, the aforementioned Silquest® A-1230 manufactured by Momentive Performance Materials, and Dynasylan® 4144 manufactured by Evonik/Degussa.

The amount of dispersant used to disperse the silica coated white metal oxide pigment and other solids may vary from about 0.3% by weight to about 300% by weight of the white metal oxide pigment content. In some examples, the dispersant content range is from about 0.5 to about 150% by weight of the white metal oxide pigment content. In some other examples, the dispersant content range is from about 5 to about 100% by weight of the white metal oxide pigment content.

A dispersion of white metal oxide pigment suitable for forming the white inks of the present disclosure can be prepared via milling or dispersing metal oxide powder in water in the presence of suitable dispersants and silica. For example, the metal oxide dispersion may be prepared by milling commercially available inorganic oxide pigment having large particulate size (in the micron range) in the presence of a polymeric dispersant and silica or by milling of white oxide pigment coated with silica-rich gel-coat until the desired particulate size is achieved. The starting dispersion to be milled can be an aqueous dispersion with solid content up to 65% by weight of the white metal oxide pigment or pigments. The milling equipment that can be used may be a bead mill, which is a wet grinding machine capable of using very fine beads having diameters of less than 1.0 mm (and, generally, less than 0.5 mm) as the grinding medium, for example, Ultra-Apex Bead Mills from Kotobuki Industries Co. Ltd, or MiniCer® bead mill (available from NETZSCH Premier Technologies, LLC., Exton, Pa.). The milling duration, rotor speed, and/or temperature may be adjusted to achieve the dispersion particulate size desired. In one example, the polymeric dispersant can include a short-chain anionic dispersant or a non-ionic or predominantly non-ionic dispersant, or both. Thus, the polymeric dispersant and the silica can be co-milled with the white metal oxide pigment, thereby modifying both the surface of white metal oxide pigment and physical character of the silica (creating a coating of silica on the reduced size white metal oxide pigment). The freshly milled surface and coating can thus be highly accepting of the polymeric dispersant.

It is also notable that there can be some advantages to adding the latex particulates to the inks of the present disclosure. For example, by combining the modified white metal oxide pigment (modified by silica coating and polymeric dispersant) with latex particulates, opacity can be increased further. In one aspect, a white metal oxide pigment to latex particulate weight ratio can be from 6:1 to 1:3. In certain specific examples, by selecting white metal oxide pigment with a high refractive index (e.g. from 1.8 to 2.8), and latex particulates with a relatively lower refractive index (e.g., from 1.3 to 1.6), the opacity of the ink when printed on a media sheet can be unexpectedly increased further compared to an ink without the added latex particulates.

Furthermore, the latex particles (at high enough concentration) can form continuous polymer phase after the ink printing and drying/curing. This polymer phase can bind rigid particles into continuous coating with good mechanical durability, i.e. act as a binder phase. In the absence of the binder in these ink formulations, the printed layer would may not have as much mechanical durability (reduced rub resistance, etc.). In one example, a latex dispersion may be produced by emulsion polymerization or co-polymerization of acrylic and styrene monomers. The list of suitable monomers can include (but is not limited to) C1 to C8 alkyl methacrylates and alkyl acrylates, styrene and substituted methyl styrenes, polyol acrylates and methacrylates such as hydroxyethyl acrylate, acrylic acid, methacrylic acid, polymerizable surfactants, or the like.

The monomers used in the latexes can also be vinyl monomers. In one example, the monomers can be one or multiple of vinyl monomers (such as vinyl chloride, vinylidene chloride, etc.), vinyl ester monomers, acrylate monomers, methacrylate monomers, styrene monomers, ethylene, maleate esters, fumarate esters, itaconate esters, or mixtures thereof. In one aspect, the monomers can include acrylates, methacrylates, styrenes, or mixtures thereof. The monomers can likewise include hydrophilic monomers including acid monomers as mentioned, as well as hydrophobic monomers. Furthermore, monomers that can be polymerized in forming the latexes include, without limitation (some of which being previously mentioned), styrene, α-methyl styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, 2-ethylhexyl acrylate, 2-ethylhexyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, isobornyl methacrylate, cyclohexyl methacrylate, tri methyl cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, combinations thereof, derivatives thereof, or mixtures thereof.

Acidic monomers that can be polymerized in forming latexes include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinyl-succinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, or mixtures thereof.

In one specific example, the acidic monomer content in the latex mix can range from 0.1 wt % to 15 wt % and the balance being non-acidic monomers, with suitable latex particle sizes range from 50 nm to 300 nm. Glass transition temperatures may range from −20° C. to 130° C. The latex content in the white ink formulations, when present, may range from 2 wt % to 30 wt %, or from 3 wt % to 20 wt %, or more typically from 5 wt % to 15 wt %.

As mentioned, the particulate size of the white metal oxide pigment can be from 100 nm to 1,000 nm, but in other examples, the particulate size can be from 125 nm to 700 nm, from 150 nm to 500 nm, or 180 nm to 400 nm. These larger sized particulates are considered to be efficient particulate sizes for light scattering when spaced appropriately by the silica coating and the latex particulates. The more efficient the light scattering, typically, the more opaque the printed ink layer may be (assuming appropriate spacing in the pigmented layer as described herein). Thus, the white inks of the present disclosure can be formulated such that when printed, the silica coating and latex provide an average space between white metal oxide pigment ranging from 20 nm to 1,000 nm, in one example. In other examples, the average space between white metal oxide pigment can be 50 nm to 500 nm, from 50 to 300, or in one specific example, about 50 nm to 250 nm.

In further detail, optical spacing can be experimentally evaluated by printing the ink on a media substrate, and when a latex is present, fusing the ink by applying heat at a temperature about 2° C. to 110° C. above the minimum film formation temperature of the latex particulates, and evaluating using Transition Electron Microscopy (TEM) cross-section photo of a printed white ink layer after drying. If the opacity provided by the white ink is not high enough, the ratio of white metal oxide pigment to silica or to latex particulates can be adjusted up or down, as effective, or the thickness of the ink can be increased. That being stated, an advantage of the white inks of the present disclosure is that in some instances, thickness does not need to be increased to increase opacity. For example, by appropriately spacing the white metal oxide pigment with the silica and latex particulates, opacity can be boosted from 0.1% to 25%, and more typically, from 5% to 25%.

In addition to assisting with enhanced opacity, as briefly mentioned, the latex particulates can also provide enhanced durability. More specifically, the use of latex particulates, including fusible latex particulates that are thermally or otherwise cured after printing on the media substrate, can provide added durability to the printed image. Thus, the latex can provide the dual role of assisting the silica coating in enhancing opacity by appropriately spacing the white metal oxide pigment, and can also provide durability on the printed media sheet. This is particularly the case in examples where there may be high metal oxide particulate loads that are dispersed by appropriate dispersing agents. Films formed by hard ceramic particulates such as high refractive index metal oxides on surface of low porosity and non-porous media substrates tend to have very poor mechanical properties. The film-forming behavior of latex particulates described herein can bind the relatively large white metal oxide pigment (with dispersing agent present in the ink) into continuous coating that can be very durable. Additionally, as mentioned, the low refractive index of the polymer film along with the silica coating creates low refractive index or "n" domains, i.e. optical spacers between high n white metal oxide pigment particles, thereby enhancing opacity of the print.

Coalescence of latex particulates into continuous phase creates low refractive index domains in the coating. The refractive index of the fused latex in the coating may range from 1.3 to 1.6, and in one example, can be from 1.4 to 1.6, or 1.4 to 1.5. That, in conjunction with the silica (or silica and alumina) coating with a refractive index ranging from 1.4 to 1.7, is contrasted with the white metal oxide pigment particles which have a refractive index ranging from 1.8 to 2.8, or from 2.2 to 2.8. Specific examples include zinc oxide (about 2.4), titanium dioxide (about 2.5 to 2.7), zirconium oxide (about 2.4), etc. Typically, the difference in the refractive indexes can be from about 0.2 to 1.5, or more, if possible (typically, the higher is the better), though this is not always the case, as long as there is enough of a difference that the opacity can be increased at least to some degree by the optical spacing and the refractive index difference.

The latexes can have various shapes, sizes, and molecular weights. In one example, polymer in the latex particulates may have a weight average molecular weight (Mw) of about 5,000 Mw to about 500,000 Mw. In one aspect, the latex particulates can have a weight average molecular weight (Mw) ranging from about 100,000 Mw to about 500,000 Mw. In some other examples, the latex resin has a weight average molecular weight of about 150,000 Mw to 300,000 Mw.

The white inks described herein are very useful for inkjet application, including thermal inkjet application. In one example, a reactive hydrophilic alkoxysilane dispersant can be used to assist in particulate dispersion and jettability. These or other dispersants can be short-chain anionic, or non-ionic or predominantly non-ionic in nature. In some specific examples, inkjet printing of white coatings or patterns with adequate opacity (>50-60%) can benefit from a relatively high pigment load (e.g. white metal oxide pigment above 2 wt %, above 5 wt %, above 8 wt %, etc.). Jetting of high pigment load (particularly with other solids) inks becomes challenging even for piezo printheads. However, with the use of an appropriate dispersant, such as the non-ionic or predominantly non-ionic dispersants described herein, more reliable performance of higher metal oxide particulate loads printed from thermal inkjet printheads with low nominal drop weight (as low as 10 ng, or even as low as 5 ng) can be realized.

Turning now to the fixer fluid that may be used with the white inks of the present disclosure, cationic polymer can be added to various ink or liquid vehicles to form fixer fluids of various viscosities for various application processes. Cationic polymers that may be used can include guanidinium or fully quaternized ammonium functionalities, such as quaternized polyamine copolymers. In one example, the cationic polymer might not contain primary or secondary ammonium functionalities, such as polyallylamine or polyethylene imine. Generally, for some digital application processes, i.e. thermal inkjet application, the weight average molecular weight (Mw) of the cationic polymer allows viscosity of 1 cP to 25 cP at 25° C., 1 cP to 15 cP at 25° C., or 1 cP to 10 cP at 25° C., as measured on a Brookfield viscometer. Though viscosity outside of this range can be used, particularly for piezo inkjet applications or for analog (non-digital printing) applications, e.g., 1 cP to 35 cP at 25° C. (for piezo inkjet) and 1 cP to 500 cP at 25° C. for analog applications. Typical weight average molecular weight for the cationic polymer can be less than 500,000 Mw, and in one aspect, less than 50,000 Mw. In another example, cationic polymers can have high charge densities to improve fixing efficiencies. As such, cationic charge densities can be higher than 1000 microequivalents per gram cationic functionality. In one aspect, higher than 4000 microequivalents per gram can be used. Additionally, concentrations can be low to avoid regulatory issues with aquatic toxicity, e.g., from 0.1 wt % to 25 wt %, and in one aspect, 1 wt % to 5 wt %, or in another aspect, from 1 wt % to 2.5 wt %.

In additional detail, classes of cationic polymers that can be used include, but are not limited to, quaternized polyamines, dicyandiamide polycations, diallyldimethyl ammonium chloride copolymers, quaternized dimethylaminoethyl(meth)acrylate polymers, quaternized vinylimidizol polymers, alkyl guanidine polymers, alkoxylated polyethylene imines, and mixtures thereof. It is to be understood that one or even multiple polycations may be used, and that any desirable combination of the polycations can be used. One or multiple ions of the cationic polyelectrolytes may be ion-exchanged for a nitrate, acetate, mesylate, or other ion. As a non-limiting example, one material is Floquat® FL2350, a quaternized polyamine derived from epichlorohydrin and dimethyl amine, commercially available from SNF Inc.

Typical ink vehicle or fixer vehicle formulations described herein can include water and other ingredients, depending on the application method desired for use. For example, when jetting the ink or fixer, the formulation may include water as well as co-solvents present in total at from 0.1 wt % to 50 wt %, though amounts outside of this range can also be used. Further, surfactants can be present, ranging from 0.01 wt % to 10 wt %. The balance of the formulation can further include or other vehicle components known in the art, such as biocides, viscosity modifiers, materials for pH adjustment, sequestering agents, preservatives, and the like. Typically, the ink vehicle can include water as one of a major solvent and can be referred to as an aqueous liquid vehicle. It is noted that the fixer fluid may be formulated for inkjet application or for analog coating processes, and thus, the ingredients and concentrations for such different applications can vary widely. For example, a thicker slurry may be used for analog application, or a less viscous fluid may be used for digital application.

Apart from water, the ink vehicle can include high boiling solvents and/or humectants such as aliphatic alcohols, aromatic alcohols, diols, glycol ethers, polyglycol ethers, 2-pyrrolidinones, caprolactams, formamides, acetamides, and long chain alcohols. Examples of such compounds include but are not limited to 2-pyrrolidinone and 2-methyl-1,3-propanediol. The concentration range for high boiling solvents and/or humectants in the ink can be from 0.1 wt % to 30 wt %, depending on the printhead jetting architecture, though amounts outside of this range can also be used.

Classes of co-solvents that can be used can include organic co-solvents including aliphatic alcohols, aromatic alcohols, diols, glycol ethers, polyglycol ethers, 2-pyrrolidinones, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

Consistent with the formulation of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0.01 wt % to 2 wt %, for example, can be used. Viscosity modifiers and buffers may also be present, and/or other additives to modify properties of the ink as desired. Such additives can be present at from 0.01 wt % to 20 wt %.

The white inks of the present disclosure can be made by various methods. However, in one example, a method of making white inks is shown and described in FIG. 6, which provides a flow chart depicting such a method. This method can include milling 110 a white metal oxide pigment coated with silica in a water-based carrier with a polymeric dispersant to form a white dispersion containing a suspended white colorant; and admixing 120 ink vehicle with the white dispersion to form a white ink. Again, in this example, the white metal oxide pigment can have an average particulate size from 100 nm to 2,000 nm, a silica coating on the white metal oxide pigment forming silica-coated pigment, and a polymeric dispersant associated with the silica-coated pigment. The white metal oxide pigment content to silica content can be from 100:3.5 to 5:1 by weight.

It is noted that when discussing the present inks, fluid sets, and/or methods, each of these discussions can be considered applicable to each of these examples, whether or not they are explicitly discussed in the context of that technical feature. Thus, for example, in discussing refractive index related to a composition or the opacity in the context of the white ink, such elements are also relevant to and directly supported in the context of the methods described herein, and vice versa.

It is to be understood that this disclosure is not limited to the particular processes and materials disclosed herein because such processes and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

The term "white metal oxide pigment" refers to pigments that impart a white color to a ink, but may in fact be essentially colorless pigments with a high refractive index, e.g., greater than 1.6 or greater than 1.8. For Example, titanium dioxide ($TiO_2$) is an example of such a pigment that imparts white color to an ink, but when viewed on a particle by particle basis, can appear colorless.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Furthermore, it is understood that any reference to open ended transition phrases such "comprising" or "including" directly supports the use of other know, less open ended, transition phrases such as "consisting of" or "consisting essentially of" and vice versa.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following illustrates some examples of the disclosed inks, methods, and fluid sets that are presently known. However, it is to be understood that the following are only examples or illustrative of the application of the principles of the present disclosure. Numerous modifications and alternative examples may be devised without departing from the spirit and scope of the present compositions and methods. Thus, while the present inks, methods, and fluid sets have been described above with particularity, the following examples provide further detail in connection with what are presently deemed to be related to certain desirable features.

Example 1

Five different silica coated titanium dioxide pigments (rutile modification) with polymeric dispersant associated with the surface were prepared and shown to be effective in their ability to form loose flocs upon settling, as set forth in Table 1 below:

TABLE 1

| Pigment | Silica (wt %) | Alumina (wt %) | Silica and Alumina Total (wt %) |
|---|---|---|---|
| [1]TR60 | 3.6 | 3.1 | 6.7 |
| [1]TR50 | 5.3 | 2.6 | 7.9 |
| [2]Ti-Pure ® R960 | 5.5 | 3.3 | 8.8 |
| [3]CR-813 | 7 | 3.5 | 10.5 |
| [2]Ti-Pure ® R931 | 10.2 | 6.4 | 16.6 |

[1]Huntsman
[2]DuPont
[3]Tronox
Note
Rutile modified $TiO_2$ has an n value of 2.7 (the highest among optically transparent materials) and a bulk density of about 4.2 leading to settling.

Each of these silica-coated pigments with polymeric dispersant associated with the surface thereof was prepared by taking powder forms of the silica-coated pigments (or gel-coated pigments) and dispersing it in a water-based slurry containing about 20-70 wt % of the pigment and two polymeric dispersants. The two dispersants included a short-chained anionic polymeric dispersant present at from 0.05 wt % to 3 wt % (based on dry pigment weight) and a non-ionic dispersant present at from 0.1 wt % to 4% % (based on dry pigment weight). The milling continued until a mean pigment particle size was reached that was optimum for light-scattering, i.e. from about 180 to 350 nm, typically.

Example 2

Three different titanium dioxide (rutile form) pigments coated with silica and dispersed with a polymeric dispersant were prepared, as follows:

High Silica Gel-Coat Dispersion 1—

A milled slurry was prepared that contained $TiO_2$ pigment powder with 5.5 wt % silica and 3.3 wt % alumina (wt % based on pigment content) dispersed with multiple polymeric dispersants. The pigment powder was obtained from DuPont, and is know commercially as Ti-Pure® R960. The slurry contained about 50 wt % of the Ti-Pure® R960, 0.5 wt % (based on dry polymer weight) low M weight polyacrylic acid based on dry polymer weight (Carbosperse® K-7028 available from Lubrizol Corporation), and 0.8 wt % (based on dry polymer weight) of a branched co-polymer of comb-type structure with polyether pendant chains and acidic anchor groups attached to a backbone (Disperbyk®-190 dispersant available from BYK Chemie). The milling was done in a MiniCer® bead mill (available from NETZSCH Premier Technologies, LLC., Exton, Pa.) utilizing YTZ milling beads with 0.3 mm diameter. Milling duration was about 120 min. Mean particle size of $TiO_2$ in the milled dispersion was about 250 nm (as determined by NANOTRACK® particle size analyzer from Microtrack Corp., Montgomeryville, Pa.).

High Silica Gel-Coat Dispersion 2—

A milled slurry was prepared that contained $TiO_2$ pigment powder with 10.2 wt % silica and 6.4 wt % alumina (wt % based on pigment content) dispersed with multiple polymeric dispersants. The pigment powder was obtained from DuPont, and is know commercially as Ti-Pure® R931. The slurry contained about 50 wt % of the Ti-Pure® R931, 0.5 wt % (based on dry polymer weight) low M weight polyacrylic acid based on dry polymer weight (Carbosperse® K-7028 available from Lubrizol Corporation), and 0.8 wt % (based on dry polymer weight) of a branched co-polymer of comb-type structure with polyether pendant chains and acidic anchor groups attached to a backbone (Disperbyk®-190 dispersant available from BYK Chemie). The milling was done in a MiniCer® bead mill (available from NETZSCH Premier Technologies, LLC., Exton, Pa.) utilizing YTZ milling beads with 0.3 mm diameter. Milling duration was about 120 min. Mean particle size of $TiO_2$ in the meld dispersion was about 272 nm (as determined by NANOTRACK® particle size analyzer from Microtrack Corp., Montgomeryville, Pa.).

Low Silica Gel-Coat Dispersion (Control)—

A milled slurry was prepared that contained $TiO_2$ pigment powder with about 3.2 wt % silica and 2.5 wt % (wt % based on pigment content) dispersed with multiple polymeric dispersants. The pigment powder was obtained from DuPont, and is know commercially as Ti-Pure® R706. The slurry contained about 50 wt % of the Ti-Pure® R706, 0.5 wt % (based on dry polymer weight) low M weight polyacrylic acid based on dry polymer weight (Carbosperse® K-7028 available from Lubrizol Corporation), and 0.8 wt % (based on dry polymer weight) of a branched co-polymer of comb-type structure with polyether pendant chains and acidic anchor groups attached to a backbone (Disperbyk®-190 dispersant available from BYK Chemie). The milling was done in a MiniCer® bead mill (available from NETZSCH Premier Technologies, LLC., Exton, Pa.) utilizing YTZ milling beads with 0.3 mm diameter. Milling duration was about 120 min. Mean particle size of $TiO_2$ in the meld dispersion was about 230 nm (as determined by NANOTRACK® particle size analyzer from Microtrack Corp., Montgomeryville, Pa.).

Rheology Profile—

Figures 6, 7:
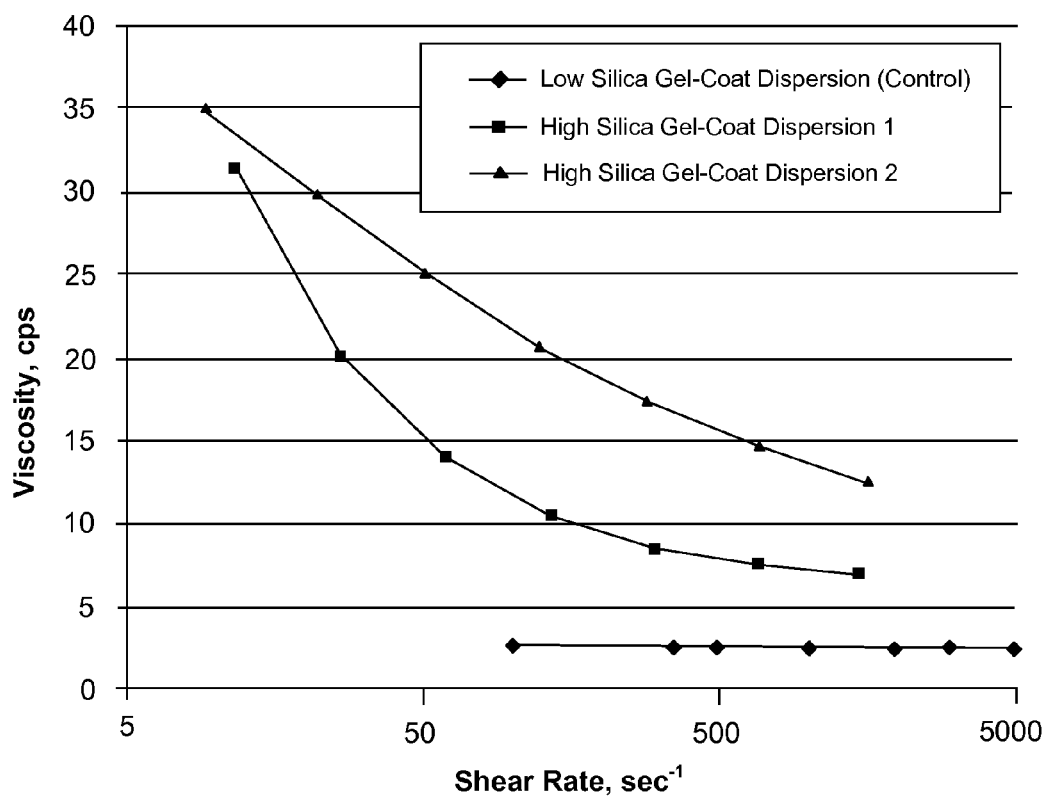
FIG. 6 is a flow chart depicting a method of preparing a white ink in accordance with Examples of the present disclosure.
FIG. 7 is a graph depicting the non-Newtonian characteristics of dispersions used for preparing non-Newtonian white inks in accordance with examples of the present disclosure.

A rheology profile of the three dispersions was characterized on m-VROC capillary viscometer available from Rheosense, Inc. In this study, viscosity vs. shear rate scans is provided, as shown in FIG. 7. High Silica Gel-Coat Dispersion 1 and High Silica Gel-Coat Dispersion 2 showed non-Newtonian (shear thinning) and higher viscosity behavior, while the Low Silica Gel-Coating Dispersion (Control) had significantly lower viscosity and behaved like a Newtonian fluid (viscosity practically independent of shear rate). Additionally, sediments were formed by ambient settling (~3 weeks). The high silica gel-coat dispersions formed a voluminous, loose sediment that was easily resuspendable, whereas the low silica gel-coat dispersion formed a compact sediment at the bottom which was not easily resuspended.

In further detail, this dramatic viscosity increase (in low SR range) typical for dispersions based on high silica gel-coat $TiO_2$ pigments indicated formation of multi-particle agglomerates in the slurry. Key distinguishing property of high silica gel-coat dispersions capable of forming sediments with benign redispersibility behavior was their shear-thinning rheology behavior becoming quite pronounced when the $TiO_2$ pigment solids content in the liquid slurry was within 40-55 wt % range. More than 1.5-2 times viscosity increase while lowering measurement shear rate from 1000 to 10 $sec^{-1}$ in most of the cases correlated with more desirable sediment redispersibility.

Example 3

Two pigment dispersions and two inks were prepared for comparison purposes, i.e. Example Dispersion (53.2 wt % pigment); Control Dispersion (52 wt % pigment); Example Ink (about 15 wt % pigment); and Control Ink about 15 wt % pigment). The Example Dispersion and Example Ink were prepared based on the silica-rich Ti-Pure® R960 $TiO_2$ pigment (5.5 wt % silica). The Control Dispersion and Control Ink were prepared based on the predominantly silica/alumina-coated Ti-Pure® 706 (3.2 wt % silica). Both Ti-Pure® R706 and R960 dispersions and inks contained Carbosperse® K-7028 dispersant (0.5 wt. % per dry pigment) and Disperbyk®-190 dispersant (0.8 wt. % per dry pigment). The Example Dispersion and the Control Dispersion are dispersed in water at over 50 wt % pigment content. The Example Ink and the Control Ink use the Example Dispersion and the Example Ink in the preparation thereof, and the formulations are shown in Table 2 below.

TABLE 2

| Components | Control Ink Target, wt % | Example Ink Target, wt % |
|---|---|---|
| 2-methyl-1,3-propanediol | 9 | 9 |
| 2-Pyrrolidinone | 16 | 16 |
| [1]Tergitol ® 15-S-7 | 0.9 | 0.9 |
| [2]Capstone ® FS-35 | 0.5 | 0.5 |
| [1]Tergitol ® TMN-6 | 0.9 | 0.9 |
| Acrylic binder latex (41.5 wt %) | 21.75 | 21.75 |
| [2]Ti-Pure R706 $TiO_2$ (Pigment-51.5 wt %) | 29.1 | — |
| [2]Ti-Pure R960 $TiO_2$ (Pigment-53.2 wt %) | — | 28.2 |
| Water | Balance | Balance |

[1]Dow Chemical Company
[2]DuPont

As can be seen by Table 2, the $TiO_2$ pigment content in both inks was about 15 wt %. Both inks were printed from HP 792 printhead using an HP OfficeJet® 8000 printer with good nozzle health performance (no missing nozzles after the 1 page of high ink flux density printing). Sedimentation of both inks was simulated by centrifuging them in Eppendorf® tubes at 600 rpm for 2 hrs. X-ray pictures of the test-tubes taken after the centrifugation showed the formation of dense compacted sediment with the Control Ink and very loose and voluminous sediment in the case of the Example Ink.

Figure 8:
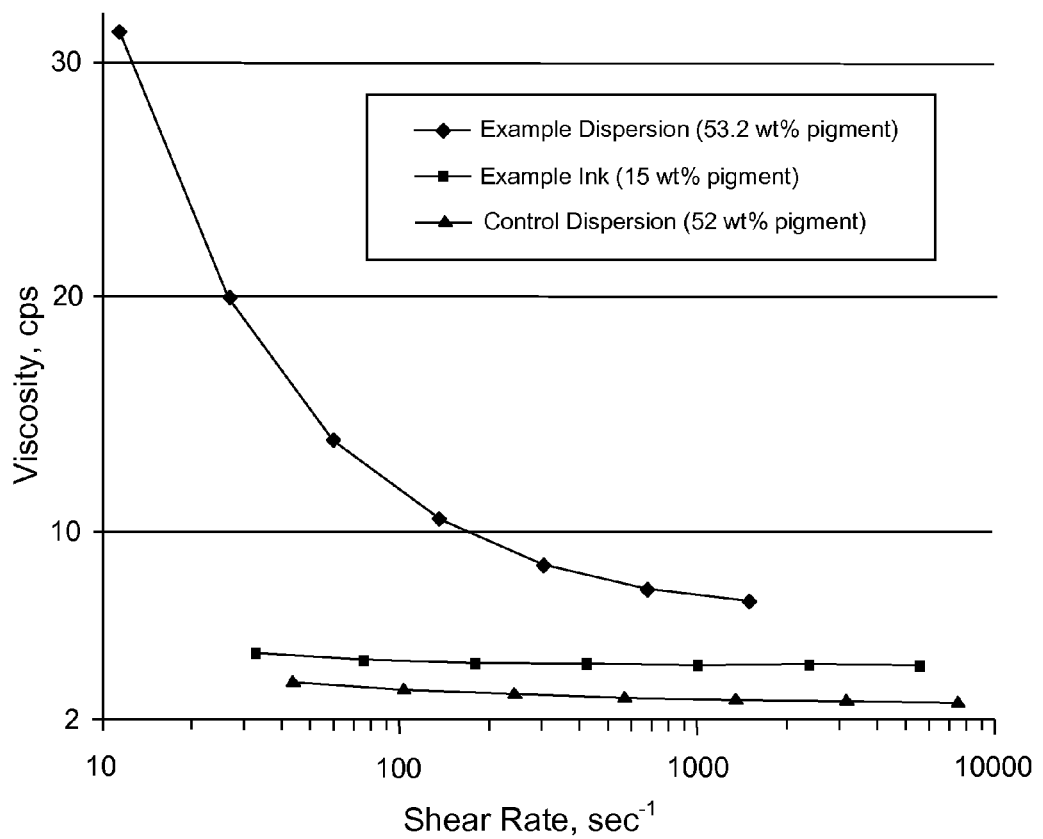
FIG. 8 is a graph depicting the non-Newtonian characteristic of a dispersion used for preparing non-Newtonian white inks, as well as the non-Newtonian characteristic of a white ink prepared in accordance with examples of the present disclosure.

Rheological characterization of the Example Dispersion and the Control Dispersion, as well as the Example Ink, was conducted. The Example Dispersion showed pronounced non-Newtonian character (viscosity reduced ~4-5× at an increase from 30 sec$^{-1}$ to 3000 sec$^{-1}$ at 25° C.), while the corresponding Example Ink still showed some Newtonian behavior (viscosity reduced about 10% within the same range of 30 sec$^{-1}$ to 3000 sec$^{-1}$ at 25° C.). On the other hand, the Control Dispersion (with moderate level of silica/alumina gel-coat) showed quite low viscosity (<4 sps) and almost Newtonian behavior within the same range of 30 sec$^{-1}$ to 3000 sec$^{-1}$ at 25° C. in spite of the high pigment solids content (~52 wt. %). The data for the rheology study is shown in FIG. 8.

While the disclosure has been described with reference to certain examples, various modifications, changes, omissions, and substitutions can be made without departing from the spirit of the disclosure. It is intended, therefore, that the present disclosure be limited only by the scope of the following claims.

What is claimed is:

1. A white ink, comprising:
an aqueous ink vehicle; and
from 5 wt % to 60 wt % of a white flocculated colorant mass, comprising:
white metal oxide pigment having an average particulate size from 100 nm to 2,000 nm,
silica coated on the white metal oxide pigment forming a silica-coated pigment, wherein the white metal oxide pigment content to silica content is from 100:3.5 to 5:1 by weight, and
a polymeric dispersant associated with a surface of the silica-coated pigment.

2. The white ink of claim 1, further comprising alumina also coated on the white metal oxide pigment.

3. The white ink of claim 2, wherein the white metal oxide pigment content to total silica and alumina content is from 50:3 to 4:1 by weight.

4. The white ink of claim 1, wherein the white ink comprises from 5 wt % to 50 wt % white metal oxide pigment, from 0.175 wt % to 10 wt % silica, and from 0.005 wt % to 5 wt % polymeric dispersant.

5. The white ink of claim 1, wherein the white metal oxide pigment includes titanium dioxide particulates, zinc oxide particulates, zirconium oxide particulates, or combinations thereof.

6. The white ink of claim 1, wherein the white ink further comprises latex particulates having a glass transition temperature from −20° C. to 130° C.

7. The white ink of claim 1, wherein the polymeric dispersant includes a short-chain anionic dispersant having an acid number higher than 100 mg KOH/g based on dry polymer weight, or a non-ionic or predominantly non-ionic dispersant having an acid number not higher than 100 mg KOH/g based on dry polymer weight, or both.

8. The white ink of claim 1, wherein the white ink is in an agitated state so that the white flocculated colorant mass is resuspended in the form of a suspended white colorant in the liquid vehicle.

9. The white ink of claim 1, wherein the white ink is non-Newtonian as defined by viscosity measured at a 10 sec$^{-1}$ shear rate that is at least 10% higher than the viscosity measured at shear rate of 1000 sec$^{-1}$ at 25° C.

10. A method of making a white ink, comprising:
milling a white metal oxide pigment coated with precipitated silica in a water-based carrier with a polymeric dispersant to form a white dispersion containing a suspended white colorant, the suspended white colorant, comprising:
white metal oxide pigment having an average particulate size from 100 nm to 2,000 nm,
silica coated on the white metal oxide pigment forming a silica-coated pigment, wherein the white metal oxide pigment content to silica content is from 100:3.5 to 5:1 by weight, and
a polymeric dispersant associated with the silica-coated pigment; and
admixing an aqueous liquid vehicle with the white dispersion to form a white ink.

11. The method of claim 10, further comprising allowing the white ink to destabilize the suspended white colorant to form a white flocculated colorant mass.

12. The method of claim 10, further comprising admixing latex particulates with the white dispersion or the white ink, wherein the white ink comprises:
from 5 wt % to 60 wt % of the suspended white colorant;
from 0.1 wt % to 15 wt % of the silica;
from 0.005 wt % to 5 wt % of the polymeric dispersant; and
from 2 wt % to 30 wt % of the latex particulates having a glass transition temperature from −20° C. to 130° C.

13. A fluid set for inkjet imaging, comprising:
a white ink, comprising:
an aqueous ink vehicle;
from 5 wt % to 60 wt % of a white flocculated colorant mass suspended in the aqueous ink vehicle, said white flocculated colorant mass, comprising:
white metal oxide pigment having an average particulate size from 100 nm to 2,000 nm,
silica coated on the white metal oxide pigment forming a silica-coated pigment, wherein the white metal oxide pigment content to silica content is from 100:3.5 to 5:1 by weight, and
a polymeric dispersant associated with the silica-coated pigment; and
a fixer fluid, comprising:
aqueous fixer vehicle, and
from 0.1 wt % to 25 wt % cationic polymer.

14. The fluid set of claim 13, wherein the white ink is formulated for inkjet application upon agitation to resuspend the white flocculated colorant mass to and form a suspended white colorant in the liquid vehicle, and wherein the fixer fluid is formulated (i) for inkjet application having a viscosity from 1 cP to 35 cP at 25° C., or (ii) for analog application having a viscosity from 1 cP to 500 cP at 25° C.

15. The fluid set of claim 13, wherein the white ink further comprises alumina also coated on the white metal oxide pigment, and wherein the white metal oxide pigment content to total silica and alumina content is from 50:3 to 4:1 by weight.

16. The fluid set of claim 13, wherein the white ink comprises from 5 wt % to 50 wt % white metal oxide pigment, from 0.175 wt % to 10 wt % silica, and from 0.005 wt % to 5 wt % polymeric dispersant.

17. The fluid set of claim 13, wherein the white metal oxide pigment includes titanium dioxide particulates, zinc oxide particulates, zirconium oxide particulates, or combinations thereof.

18. The fluid set of claim 13, wherein the white ink further comprises latex particulates having a glass transition temperature from −20° C. to 130° C.

19. The fluid set of claim 13, wherein the polymeric dispersant includes a short-chain anionic dispersant having an acid number higher than 100 mg KOH/g based on dry polymer weight, or a non-ionic or predominantly non-ionic dispersant having an acid number not higher than 100 mg KOH/g based on dry polymer weight, or both.

20. The fluid set of claim 13, wherein the white ink is in an agitated state so that the white flocculated colorant mass is resuspended in the form of a suspended white colorant in the liquid vehicle.

* * * * *

UNITED STATES PATENT AND TRADEMARK OFFICE
CERTIFICATE OF CORRECTION

PATENT NO.        : 10,472,530 B2
APPLICATION NO.   : 15/561314
DATED             : November 12, 2019
INVENTOR(S)       : Vladek Kasperchik et al.

Page 1 of 1

It is certified that error appears in the above-identified patent and that said Letters Patent is hereby corrected as shown below:

On the Title Page

In item (72), Inventors, in Column 1, Line 4, delete "Aquadilla" and insert -- Aguadilla --, therefor.

Signed and Sealed this
Third Day of March, 2020

Andrei Iancu
*Director of the United States Patent and Trademark Office*